United States Patent [19]

Nott

[11] 3,990,642

[45] *Nov. 9, 1976

[54] BRIGHTENING OF NATURAL DOLOMITIC ORES

[75] Inventor: Alan J. Nott, Tennille, Ga.

[73] Assignee: Anglo-American Clays Corporation, Sandersville, Ga.

[ * ] Notice: The portion of the term of this patent subsequent to Sept. 14, 1993, has been disclaimed.

[22] Filed: June 27, 1975

[21] Appl. No.: 591,008

Related U.S. Application Data

[63] Continuation-in-part of Ser. No. 567,138, April 11, 1975.

[52] U.S. Cl. .................................. 241/20; 241/24; 241/29; 210/222
[51] Int. Cl.² ........................................ B02C 23/38
[58] Field of Search .............. 241/4, 15, 16, 20, 21, 241/24, 29; 210/222

[56] References Cited
UNITED STATES PATENTS

| | | | |
|---|---|---|---|
| 2,287,440 | 6/1942 | McCleary | 241/24 X |
| 3,307,790 | 3/1967 | Cohn et al. | 241/20 X |
| 3,512,722 | 5/1970 | Hall | 241/24 |
| 3,604,634 | 9/1971 | Windle | 241/16 |
| 3,627,678 | 12/1971 | Marston et al. | 210/222 |
| 3,819,515 | 6/1974 | Allen | 210/222 X |

Primary Examiner—Granville Y. Custer, Jr.
Attorney, Agent, or Firm—Stefan J. Klauber

[57] ABSTRACT

A method for brightening a natural dolomitic ore by removal of discoloring contaminants. The ore is crushed and formed into an aqueous slurry, which slurry is then coarse-milled to produce a product wherein no more than 1% of the particulate matter is +325 mesh. This coarse-milled product is then subjected to a further, wet-milling step, to alter the particulate such that at least 70% of the particles are less than 2 microns, E.S.D. thereby liberating substantial quantities of the discoloring contaminants. The liberated impurities are thereupon separated by subjecting the slurry to a high intensity magnetic field.

8 Claims, No Drawings

BRIGHTENING OF NATURAL DOLOMITIC ORES

This application is a continuation-in-part of my copending application, Ser. No. 567,138, filed Apr. 11, 1975, and entitled "Brightening of Natural Calcitic Ores", which application is assigned to the same assignee as the present application.

BACKGROUND OF INVENTION

This invention relates generally to pigments, and more specifically relates to a process for producing high brightness pigments by beneficiation of naturally occurring dolomitic ores, such as dolomitic limestones.

The mineral dolomite, i.e. the double carbonate $CaCO_3.MgCO_3$ is present as a component of many natural ores. Most noteworthy of these ores for present purposes are the dolomitic marbles (or dolomitic limestones). In a typical instance an ore of this type will analyze at about 30% CaO and 20% MgO; but limestone ores are usually regarded as being of the dolomitic type when the $MgCO_3$ content is in excess of about 4–5%.

Pigments derived from dolomitic ores find application in a wide variety of industrial and other environments. Such pigments, for example, can be used as fillers in the manufacture of rubber, of various plastics, and as extenders in paint formulations. In many of the aforementioned applications, particularly e.g. where the pigments are to be used for paper production, it is desirable that they be as bright as possible.

In addition it is desirable in many applications, to utilize a pigment of high purity, for reasons other than brightness alone. For example, in the preparation of certain insulating compositions, pigments derived from dolomitic ores may be used as an extender; and if metallic impurities such as pyrites are present, the electrical or electronic properties of the product can be adversely affected.

Interest has long centered upon possible use of naturally occurring dolomitic ores, such as dolomitic marble, particularly in that such natural minerals are extremely abundant in virtually all parts of the world — and therefore represent a ready source of inexpensive raw material. In practice, however, it is found that very many of the dolomitic deposits are so highly contaminated with discolorants, that when comminuted in their natural state they are simply unacceptable as pigments. Thus, in typical instances deposits which are primarily of dolomitic limestone, may be contaminated with pyrites, hematite and with mica; all of which in varying degrees contribute to the discoloration of the otherwise relatively colorless material.

Various proposals have from time to time been advanced for processes directed at improving the brightness of the aforementioned naturally occurring dolomitic ores. By and large, however, the techniques of the prior art have not been particularly effective in producing high brightness pigments from natural dolomitic sources. Indeed in most instances where pigments are derived on a commercial scale from such natural sources, an ore is utilized which to begin with is of very high purity and relatively free from discoloring contaminants. Reference may be had in this connection, for example, to U.S. Pat. No. 3,592,674, which cites the use of pigments derived from a high purity natural dolomitic limestone — which to begin with is essentially free of discoloring contaminants.

In accordance with the foregoing, it may be regarded as an object of the present invention, to provide a process which enables the production of high quality bright dolomitic pigments, from naturally occurring dolomitic ores containing relatively high levels of discoloring contaminants.

SUMMARY OF INVENTION

Now in accordance with the present invention, the foregoing objects, and others as will become apparent in the course of the ensuing specification, are achieved by a method pursuant to which the natural dolomitic ore, such as dolomitic marble or so forth, is initially crushed, and is thereupon formed into an aqueous slurry. The slurry is then coarse-milled to produce a product wherein preferably no more than 1% of the particulate matter is +325 mesh. This initial coarse-milling may, for example, be effected by use of a ball mill. The product is then subjected to a further wet-milling step, the objective of which is to alter the particulate such that at least 70% (and preferably at least 90%) of the resultant particles are less than 2 microns. This fine milling step is preferably effected by sand grinding.

In consequence of the aforementioned steps, and especially of the fine milling step, substantial quantities of the discoloring contaminants, such as pyrites, hematite, mica or so forth, are liberated, and in consequence are in a condition enabling their removal by a subsequent separation step — pursuant to which the fine-milled slurry is subjected to a high intensity magnetic field.

Following the high intensity magnetic separation, the purified slurry may be dewatered to produce a dry powder if the pigment is desired in this form; or alternatively the slurry may be retained in aqueous form if it is to be so utilized for coating or other purposes.

DESCRIPTION OF PREFERRED EMBODIMENT

In order to demonstrate the efficacy of the present inventive process, a series of Examples illustrative thereof will now be set forth. The samples utilized in these Examples included as discoloring impurities (among other elements) fine quartz, sand, mica and quantities of fine pyrites.

EXAMPLE I

A natural dolomitic marble sample in accordance with the preceding paragraph was obtained from Lime Products Corp., Union, Maine. The sample analyzed at 31.4% CaO and 18.8% MgO, indicating its highly dolomitic nature. The sample was subjected to preliminary crushing by a press, and thence was further crushed by use of a cone crusher. The product at this point included approximately 55% −60 mesh, and substantially 0% +10 mesh. The sample was thereupon formed into an aqueous slurry and ball-milled at 65% solids with 0.45 weight % Dispex (based on dry weight of Dispex) until the product had no more than 1% on a 325 mesh screen. ("Dispex" is a trademark of Allied Colloids, Great Britain, for polymethacrylic salts.) 17% of the particulate at this point had an ESD less than 2 microns. The brightness of this product as determined on the standard G.E. scale was 92.6. In all instances in this specification it will be understood that brightness values are obtained according to the standard specification established by TAPPI procedure T-646m-54.

EXAMPLE II

The ball-milled product of Example I was subjected to a magnetic separation by forming same into an aqueous slurry at about 30% solids, and subjecting the slurry to a high intensity magnetic field by passing same through a steel wool matrix maintained in a magnetic field of approximately 15 kilogauss average intensity. The retention time in the field was about 1–2 minutes. The resultant product displayed a G.E. brightness of 93.3.

EXAMPLE III

The product resulting from the magnetic separation treatment of Example II, was subjected to a further fine-milling operation, by wet-grinding same with Ottawa sand. This fine grinding was effected at 65% solids, and for a time duration sufficient to reduce the particulate such that 90% of the particles had an equivalent spherical diameter (ESD) less than 2 microns. This product was then found to display a G.E. brightness of 93.2. This is virtually identical with the brightness level of Example II, and indicates that the fine grinding alone is not especially effective in attaining brightness improvement.

EXAMPLE IV

The ball-milled product of Example I was subjected here to the same fine-grinding operation described in Example III, i.e. to wet-grinding with Ottawa sand. No magnetic separation step intervened between the coarse-milling and fine-grinding steps. The resultant product displayed a G.E. brightness of 92.4.

EXAMPLE V

In this Example a sample prepared as in Example IV, was subsequently subjected to a high intensity magnetic separation, under conditions substantially identical to those set forth in Example II. An exceptional increase in brightness was noted, with the resultant product displaying a G.E. brightness of 98.0.

It will be evident from the foregoing sequence of Examples, that the high intensity magnetic separation is able to achieve its most noteworthy results when the fine-grinding step of the invention comprises part of the attrition process. This suggests that the nature of the impurities acted upon by the high intensity field is such, that their full release requires the very fine grinding sequence set forth.

The magnetic separation step of the present invention is preferably brought about by passing the aqueous slurry through a slurry-pervious ferromagnetic matrix, while a high intensity magnetic field is applied at the matrix. The said field may be generated by electromagnets or by other field sources, which in typical apparatus utilized for these purposes, at least partially surround a non-magnetic canister in which the matrix is packed. The matrix material, as known in the art, preferably comprises a packed stainless steel wool, although other filamentary or strandlike materials may be effectively used for this purpose; as may matrices of steel balls, tacks, or of other slurry-pervious ferromagnetic materials. Apparatus of this general type may be noted, for example, in Marston, U.S. Pat. No. 3,627,678, although it is to be understood that the invention is in no sense limited to use with specific types of magnetic separating devices.

The average field intensity maintained at the matrix during the separation process is in the general range of 7 to 22 kilogauss, but a preferable field intensity during the separation process is about 15 to 20 kilogauss. Within the limits of magnetic separator technology, higher field intensities can also be effectively utilized with the invention. The slurry is passed through the matrix at such a rate as to be maintained in the field for at least 15 seconds, with from ½ to 2 minutes retention time being preferred. Subject to the effect on processing rates, longer retention times are also acceptable, and can occur from either a single pass or via cumulative passes through the matrix. The slurry, as passed through the magnetic separator, typically includes from about 20 to 70% solids, with 20 to 40% solids being preferred.

While the present invention has been particularly set forth in terms of specific embodiments thereof, it will be understood in view of the instant disclosure, that numerous variations upon the invention are now enabled to those skilled in the art, which variations yet reside within the scope of the present teaching. For example, in the comminution processes of Examples I and III, wet milling of a deflocculated slurry and fine grinding are each effected by about 65% solids. If desired, however, one may mill at low solids such as 30% (with little or no deflocculant), fine grind and then magnetically separate. The low solids material may then be thickened, e.g. to 70%, by filtration or evaporation; or may be completely dried.

Similarly, while the fine grinding step of the invention has been particularly described wherein the grinding media comprises a very fine sand, other grinding media and techniques as are capable of achieving comparable degrees of comminution, may be employed in the present invention.

Accordingly, the invention is to be broadly construed, and limited only by the scope and spirit of the claims now appended hereto.

I claim:
1. A method for brightening and purifying a natural dolomitic ore by removing discoloring contaminants therefrom, comprising the steps of:
   crushing said ore;
   forming said crushed ore into an aqueous slurry, and coarse-milling said slurry to produce a coarse-milled product;
   liberating substantial quantities of said discoloring contaminants by subjecting said coarse-milled product to a further wet-milling step to alter the particulate such that at least 70% of the particles are less than 2 microns; and
   separating the liberated contaminants from said further milled slurry, by subjecting said slurry to a wet magnetic separation in a high intensity magnetic field.
2. A method in accordance with claim 1, wherein said coarse-milling step effects comminution such that the coarse-milled product no more than 1% of the particulate matter is +325 mesh.
3. A method in accordance with claim 1, wherein said wet-milling step alters the particulate such that at least 90% of the particles are less than 2 microns.
4. A method in accordance with claim 1, further including the step of de-watering the purified slurry to yield a dry particulate.

5. A method in accordance with claim 3, wherein said further milling step is effected by sand grinding of the product yielded by said coarse-milling step.

6. A method in accordance with claim 5, wherein said coarse-milling step is effected by ball-milling said slurry until no more than 1% of the particulate matter is +325 mesh.

7. A method in accordance with claim 3, wherein said magnetic separation is conducted by subjecting said slurry to a magnetic field having an average intensity of at least 15 kilogauss.

8. A method in accordance with claim 7, wherein said slurry is retained in the magnetic field from between ½ to 2 minutes.

* * * * *